(12) United States Patent
Bürgel (10) Patent No.: US 10,557,520 B2
(45) Date of Patent: Feb. 11, 2020

(54) AUTOMATIC DISPENSER FOR BALANCING WEIGHTS

(71) Applicant: WEGMANN automotive GmbH, Veitshöchheim (DE)

(72) Inventor: Hans-Ulrich Bürgel, Roden (DE)

(73) Assignee: WEGMANN automotive GmbH, Veitshöchheim (DE)

( * ) Notice: Subject to any disclaimer, the term of this patent is extended or adjusted under 35 U.S.C. 154(b) by 0 days.

(21) Appl. No.: 16/392,350

(22) Filed: Apr. 23, 2019

(65) Prior Publication Data

US 2019/0249750 A1     Aug. 15, 2019

Related U.S. Application Data

(63) Continuation of application No. PCT/EP2017/076496, filed on Oct. 17, 2017.

(30) Foreign Application Priority Data

Oct. 24, 2016   (EP) ..................................... 16195255

(51) Int. Cl.
*F16F 15/32* (2006.01)
*G01M 1/32* (2006.01)

(52) U.S. Cl.
CPC ........... *F16F 15/328* (2013.01); *G01M 1/326* (2013.01)

(58) Field of Classification Search
CPC ........ F16F 15/32; F16F 15/326; F16F 15/328; B60C 19/00; B60C 19/003
See application file for complete search history.

(56) References Cited

U.S. PATENT DOCUMENTS 3,960,409 A    6/1976 Songer
6,364,421 B1 *  4/2002 Pursley ................. F16F 15/328
                                               301/5.21
(Continued)

FOREIGN PATENT DOCUMENTS

CN          104471282 A      3/2019
EP            1253414        4/2002
(Continued)

OTHER PUBLICATIONS

Office Action from the Chinese Patent Office in related application CN 201780065550.3 (translation).

*Primary Examiner* — Jason Daniel Prone
*Assistant Examiner* — Richard D Crosby, Jr.
(74) *Attorney, Agent, or Firm* — Quarles & Brady LLP; Yakov Sidorin (57) ABSTRACT

An automatic dispenser for balancing weights including a transport section and a cutting section. The transport section contains a transport roller with a plurality of teeth at its circumferential outer surface generating friction to a belt of balancing weights to transport this belt to the cutting section. Such belt contains a plurality of individual balancing weight segments. The cutting section has an arc shaped belt guide for forming the belt of balancing weights to a curve thus opening at least one gap between neighboring balancing weight segments. The cutting section has a knife movable from a first side of the belt of balancing weights to its second side, to separate the belt of balancing weights at a gap between two individual balancing weight segments.

9 Claims, 4 Drawing Sheets

(56) References Cited

U.S. PATENT DOCUMENTS

| | | | | |
|---|---|---|---|---|
| 7,931,342 B2* | 4/2011 | Spaulding | | G01M 1/326 |
| | | | | 73/470 |
| 8,554,363 B2* | 10/2013 | Sperry | | B31D 5/0073 |
| | | | | 700/232 |
| 8,561,464 B2* | 10/2013 | Peinelt | | G01M 1/326 |
| | | | | 73/470 |
| 8,567,653 B2* | 10/2013 | Wetsch | | B26F 3/002 |
| | | | | 225/103 |
| 9,248,969 B2* | 2/2016 | Burgel | | G01M 1/326 |
| 10,024,388 B2* | 7/2018 | Heger | | F16F 15/324 |
| 10,222,288 B2* | 3/2019 | Chevrier | | G01M 1/326 |
| 2002/0107930 A1* | 8/2002 | Itoh | | G06Q 10/107 |
| | | | | 709/206 |
| 2002/0135223 A1* | 9/2002 | Gross | | F16F 15/328 |
| | | | | 301/5.21 |
| 2002/0152811 A1* | 10/2002 | Gross | | G01M 1/02 |
| | | | | 73/487 |
| 2005/0104438 A1* | 5/2005 | Petchel | | F16F 15/328 |
| | | | | 301/5.21 |
| 2006/0016309 A1 | 1/2006 | Spaulding et al. | | |
| 2009/0308965 A1* | 12/2009 | Piucci | | B26D 5/20 |
| | | | | 242/526 |
| 2015/0008278 A1* | 1/2015 | Bode | | F16F 15/324 |
| | | | | 242/562 |
| 2015/0010380 A1* | 1/2015 | Burgel | | B65G 59/067 |
| | | | | 414/797.5 |
| 2015/0202918 A1* | 7/2015 | Baek | | B60B 15/28 |
| | | | | 301/5.21 |
| 2016/0039616 A1* | 2/2016 | Burgel | | F16F 15/324 |
| | | | | 198/348 |
| 2016/0047437 A1* | 2/2016 | Burgel | | F16F 15/324 |
| | | | | 221/1 |
| 2016/0319904 A1* | 11/2016 | Hornung | | F16F 15/328 |
| 2017/0173931 A1* | 6/2017 | Burgel | | B32B 37/0046 |

FOREIGN PATENT DOCUMENTS

| | | |
|---|---|---|
| EP | 3040578 | 7/2016 |
| JP | 2014184544 | 10/2014 |
| JP | 2014185761 | 10/2014 |

* cited by examiner

AUTOMATIC DISPENSER FOR BALANCING WEIGHTS

CROSS-REFERENCE TO RELATED APPLICATIONS

This application is a continuation of the pending International Application No. PCT/EP2017/076496 filed on 17 Oct. 2017 and now published as WO 2018/077673, which designates the United States and claims priority from the European Application No. 16195255.1 filed on 24 Oct. 2016. The disclosure of each of the above-identified patent applications is incorporated herein by reference.

BACKGROUND

1. Field of the Invention

The invention relates to an automatic dispenser for balancing weights, or self-adhesive balancing weights. Such balancing weights may be used for balancing wheels of vehicles.

2. Description of Relevant Art

For balancing vehicle wheels, balancing weights are used. Self-adhesive balancing weights include segments of a mass material, which may be a metal (such as zinc or steel) having a self-adhesive tape at one side, by which the mass material may be held to a rim of a wheel. Multiple pieces or segments of such a mass material are held together by a strip of adhesive tape, thereby forming a chain or a belt of balancing weights. The self-adhesive tape is protected by a liner (also referred to as backing) on the side opposite to the balancing weight segments. Before applying a balancing weight to a rim, the liner is removed.

U.S. Pat. No. 3,960,409 shows such a belt of balancing weights, which may have a significant length and which may be wound up to a coil to simplify storage.

EP 1 253 414 A2 discloses a complex dispensing device for balancing weights. Here, the liner is removed from the self-adhesive tape, then sections of balancing weight are cut from the tape and directly fed to an applicator. This device is intended for automatic tire-balancing systems.

In tire workshops, the mass required for balancing a wheel is determined by a balancing machine, and a corresponding number of balancing weight segments is manually cut off from a belt of balancing weights. Then the liner is removed and the balancing weight is applied to a rim. Manually counting the number of required balancing weight segments and cutting them off is time-consuming and prone to errors. To allow for manual handling, the balancing weight segments must have a minimum size which may be 10 or 5 grams. Lower masses of weight segments would be difficult to handle, due to small size of the weight segments. This leads to a limited weight resolution and, therefore, to a limited precision in balancing the wheel.

EP 3 040 578 discloses an automatic dispenser for balancing weights. A belt of balancing weight segments on a self-adhesive tape is moved by a driving belt to a cutting edge. After a selected number of balancing weight segments have passed the edge, a counter holder is pressed on the edge to form a 90 degree angle between two balancing weight segments. Then, a cutting knife is moved through the edge and under the counter holder to cut the tape and to separate the selected number of balancing weight segments from the belt.

SUMMARY

Embodiments of the invention provide a simple and inexpensive dispenser of balancing weights that include at least one balancing weight segment on an adhesive tape further having a protective liner. The dispenser is configured to deliver a selected mass of self-adhesive balancing weight sections with high speed, and allows for handling of small balancing weight segments. Furthermore, the liner should be in place at the self-adhesive tape to allow manual handling of the weight.

In an embodiment, the dispenser includes a transport section and a cutting section. The transport section is configured to transport a belt of balancing weights to provide a certain amount or number of balancing weight segments, which are cut off from the belt by the cutting section. The transport section includes at least one transport roller dimensioned to move, in operation, the belt by friction. To increase friction between the transport roller and the belt, there may be a counter roller or a counter belt configured to press the belt of balancing weights against the transport roller. A counter belt may be held and/or driven by a first pulley and a second pulley.

To further increase friction between the transport roller and the belt, the transport roller is equipped with a plurality of teeth that may be disposed at the outer circumferential surface of the transport roller. These teeth may have a diameter and a length dimensioned such that the teeth intrude through the liner into the adhesive tape when the transport roller comes into contact with the belt. In an embodiment, the belt and transport roller are cooperated such that the teeth do not touch and/or damage the balancing weight segments. Experiments have shown, that such cooperation generates enough friction to precisely pull upwards a long belt from a stock located at a significantly lower level than the drive section. The mass of balancing weights, which have to be lifted from the stock, may be of several kilograms. The teeth always allow a precise transport even with minimal slipping back of the belt. A precise transport is essential for quick and precise cutting at the cutting section as the cutting knife has to precisely fit into the gap between neighboring weight segments. The embodiment of the cutting section disclosed herein is more sensitive to position in accuracies of the belt as the bending angle of the belt balancing weights is smaller than the 90° angle known from related art, and therefore the gap between neighboring balancing weights is smaller. Another advantage of the employment of the teeth at the transport roller is the perforation of the liner caused by the teeth, with formation of small holes reducing adhesion of the liner, which in turn significantly simplifies removal of the liner before applying the balancing weight to a rim of the wheel.

To improve the contact of the belt of balancing weights with the transport roller, and therefore to provide a good/desired friction for transporting the belt of balancing weights, the counter belt and/or the counter roller may be additionally pressed against the transport roller, which can be accomplished by a tensioner at the belt or at one or both of the pulleys.

In an embodiment in which a second transport roller is present, the belt of balancing weights may be pressed against the second transport roller by at least a second counter roller, which may be spring-loaded.

The transport roller may be driven by a motor, or by a stepper motor. There may be present a gear between the motor and the transport roller. For example, a worm gear may be provided, as this configuration may block or prevent the belt from moving backwards (due to the weight of the balancing weights between the stock and the drive section) when there the power to the motor is cut off.

In one embodiment, the belt of balancing weight segments may include a plurality of balancing weight segments that are held together by an adhesive tape configured to attach the balancing weight segments to a rim of a wheel. A plurality of balancing weight segments may also be held together by an additional carrier, such as a plastic or metal tape or rod.

In a related embodiment, there may be present a backing or liner to protect the adhesive surface of the adhesive tape opposing to the balancing weights.

The adhesive tape may have at least one strengthening layer to increase the shear strength of the belt to simplify transport of the belt by the transport section.

The belt of balancing weights may be wound to a coil which supplies the transport section.

In an embodiment, the transport section may be configured to pull the balancing weights at the belt of balancing weights from a stock (which may represent a coil of balancing weights) and/or push the balancing weights into the cutting section. There may be present a slideway, configured as part of the cutting section, on which the balancing weights may slide horizontally.

In one implementation, the transport section may be dimensioned to form or defined an angle (which may be in the range between 70 and 110 degrees). In a specific case, such is 90 degrees. In operation of this specific embodiment, the transport section is disposed to receive the belt of balancing weights in a vertical direction (along a vertical axis), further redirecting the balancing weights along an axis in a horizontal direction. This may be done by curving or directing the belt of balancing weights at least partially around a transport roller. Generally, however, the components may be arranged in any other mutual orientation and not necessarily in horizontal and/or vertical directions.

As a person of skill will readily appreciate, for transporting a desired number of balancing weight segments, either the length of the transported belt may be measured, or the number of balancing weight segments in the belt may be counted. Alternatively, both methods may be used together to gain an additional reference and to increase the reliability of the process. For determining the length of the transported balancing weight belt, a slot wheel may be employed that has a plurality of slots, which slots may be detected and/or counted by means of a photo sensor (for example, as a result of analyzing an output signal from the photosensor with a programmable processor). In one case, such slot wheel is connected to the transport roller, but it may also be connected to any other roller or the belt. IN a related implementation, instead of a slot wheel, there may be used any other means for detecting the rotation motion, such as a resolver or an angle encoder, for example. There may also be used a drive motor configured to drive at least one of the wheels (for example, to drive the second transport roller), which in turn may have an angle encoder or which may be configured as a stepper motor. In the case of using a stepper motor, the number of steps provides a measure of the transported length of balancing weights.

Alternatively or additionally, there may be used at least one means configured to count the number of balancing weight segments. Such counting may be effectuated by detecting the gaps between the balancing weight segments, for example by means of a photo sensor or any optical sensor (based on the output signal generated by such sensor). To increase the width or the size of the gap between the neighboring weight elements or segments, the belt of balancing weights may be bent. In one embodiment, the belt of balancing weights is bent or curved as a result of passing the belt at least partially around the transport roller while counting the balancing weights passing by the first counter roller.

In one embodiment, the cutting section includes a belt guide, against which the belt of balancing weights is pushed by the transport section. The belt guide may be arc shaped and may form or define a curve (curved surface, for example) to bend or shape the belt of balancing weights into a curved form or to confirm the belt to the curve by redirecting the belt in a different direction, such that the gap between neighboring balancing weight segments increases or widens and a cutter (the belt-cutting component of the system) can pass through the gap between the neighboring segments to cut the belt into sections. The cutting of the belt may result in cutting the adhesive tape and/or the liner. The belt guide, when used, continuously forms of the belt, which is much quicker and less time-consuming than moving a counter holder on the belt to form the belt. Due to the continuous movement of the belt at the belt guide and lack of any pressing force applied to the belt, the probability of damaging, for example, scratching the surface of balancing weight segments is much smaller than in the case of using the system of related art.

In an embodiment, the belt guide is arc shaped. It may have an inner contour of an arc segment, dimensioned to guide the balancing weight segments along such contour. The radius of the arc segment may be in a range between 2 times and 20 times, or alternatively between 5 and 10 times the thickness and/or length of a balancing weight segment. The angle of the arc segment may be in a range between 30° and 150°, or it may be 90°. The arc may be shaped and disposed within the dispenser in such a fashion that the belt, transported along the belt guide in a horizontal plane, is deflected or redirected downwards. Here, the process of bending or spatially curving of the belt is supported by gravity.

In one embodiment, the components of the dispenser are appropriately dimensioned to ensure that the cutter easily passes between neighboring balancing weights that are to be separated. Such dimensioning of the system allows to use less cutting force and to avoid damage to the surface of the balancing weight segments. (The sides of the balancing weight segments along which the cutting occurs are the outer sides of the weights, which later become visible when the weights are applied to a wheel. For that reason, there should not be any scratches or other markings caused at such outer sides of the weights.)

In an embodiment, the cutter has a knife guide holding a knife; the cutter may be configured to move from one side of the belt of balancing weights to the other side. During such movement, the knife may be guided between two balancing weight sections. The knife may only be able to cut the adhesive tape (including backing or liner) connecting the balancing weight sections. The knife may not be configured to cut the material of balancing weight sections themselves (which may be made of steel or aluminum, or any other metal).

To avoid a blockage of the dispenser and/or damaging of the knife, a position sensor configured to detect gaps between neighbor balancing weights. The position sensor may be disposed over or near the position of the knife and/or the cutting path of the knife, to enable the sensor to detect a particular gap that is used by the knife for cutting. The position sensor may also be located at a separation distance, which equal to at least one balancing weight width, from the position of the knife. If the separating distance is too large, there may be changing distances between the detected position and an open gap due to mechanical tolerances and or stretching of the belt. The position sensor may be an optical sensor, but in a related embodiment it may be a magnetic sensor, an inductive sensor, or any other appropriate sensor configured to detect a balancing weight segment and/or a gap between balancing weights and/or weight segments.

For dispensing certain mass of balancing weights, first the required number of balancing weight segments may be calculated (for example, using an output signal of the appropriate sensor operably cooperated with the belt of balancing weights), unless this number is already known. Further, the motor may be operated for a certain time, or for a certain number of steps in the case of a stepper motor to push the required number of balancing weight segments towards the belt guide. The motion of the motor may be stopped, if and when, after the required number of balancing weight segments have passed the sensor, the position sensor has detected a gap.

Then the knife is caused to move through the detected gap and to separate, cut off the required number of balancing weight segments from the belt.

Bending the belt with the use of the belt guide further reduces mechanical stress to the adhesive tape. Indeed, if instead of bending the belt, the balancing weight segments were simply pushed apart to produce a gap between two balancing weight segments, the comparatively flexible self-adhesive tape or foam would expand or lengthen, while the less flexible backing or liner would tear or at least separate from the tape. Such consequences are prevented by the belt-bending procedure as disclosed above. For manually handling the process of cutting the balancing weight segments it is essential that the liner remains in place. Otherwise, the cut segments would immediately stick to a tray into which the dispenser delivers the cut segments.

After a certain number of balancing weight segments have been cut by the cutter, they may slide and/or fall, driven by gravity, along the vertical side of the cutter base and into a tray, from which they are further disbursed or taken out and attached to a rim of a wheel.

The cutting section and the transport section of an embodiment may be used together, in the same process, as described herein. Alternatively, the cutting section may be used without a transport section, or with a different transport section. For example, the transport section may be simplified and use only a first transport roller and a first counter roller to generate the required friction to the belt of balancing weights.

The embodiments described herein allow for and facilitate automatic cutting of required mass sections form a belt of balancing weights. Due to the automatic transport and cutting, a high speed can be achieved and a large number of balancing weight can be processed in a short time interval. Furthermore standard size segments of balancing weights as well as smaller and even significantly smaller segments can be processed. This may result in a much better balancing mass resolution as compared to manual processing. Conventional balancing weight segments often are designed to have a size that can easily be handled. Therefore, lightweight segments may be comparatively thin, resulting in a larger surface, which can better be gripped or utilized, or the segments may be made of a low density material resulting in a larger size of a given segment. When an embodiment of the invention is employed, one can afford to have the balancing weight segments of very small sizes as there is no need to increase the segment size for manual handling of every segment.

Due to the automated cutting, a more mechanically stable and robust adhesive tape may be used. It may even have a robust support layer included. While it may be impossible to manually produce a clean cut for separating weight segments, the automated cutting with a guided knife and the balancing weights held in a predetermined position at the cutter edge will produce and result in a precise cut. Furthermore, the size of the balancing weight segments may be reduced to smaller sizes (such as 5 g, 2 g, 1 g or less). This increases resolution and therefore balancing precision. It is appreciated that today such small balancing weights can only be handled by an automated dispenser as they are too small for manual handling.

A further embodiment relates to a method for delivery of cut sections of balancing weights. The method includes the steps of transporting a certain number of balancing weight segments being part of a belt of balancing weights to a belt guide, bending the balancing weights extending such that a gap opens between two adjacent balancing weight segments and moving a knife from one side of the belt of the balancing weights to the other side of the belt of balancing weights, and therefore cutting a section of cut balancing weights from the belt of balancing weights.

BRIEF DESCRIPTION OF THE DRAWINGS

In the following, the invention will be described by way of examples, without limitation of the general inventive concept, of embodiments and with reference to the drawings, of which.

While the invention can be modified and assume alternative forms, specific examples embodiments are shown by way of non-limiting examples in the drawings and will be described in detail below. It should be understood, however, that the drawings and the corresponding detailed description thereto are not intended to limit the invention to the any particular disclosed forms disclosed, but on to the contrary, the scope of the intention is intended to cover all modifications, equivalents, and alternatives falling within the spirit and scope of the present invention as defined by the appended claims.

DETAILED DESCRIPTION

Figure 1:
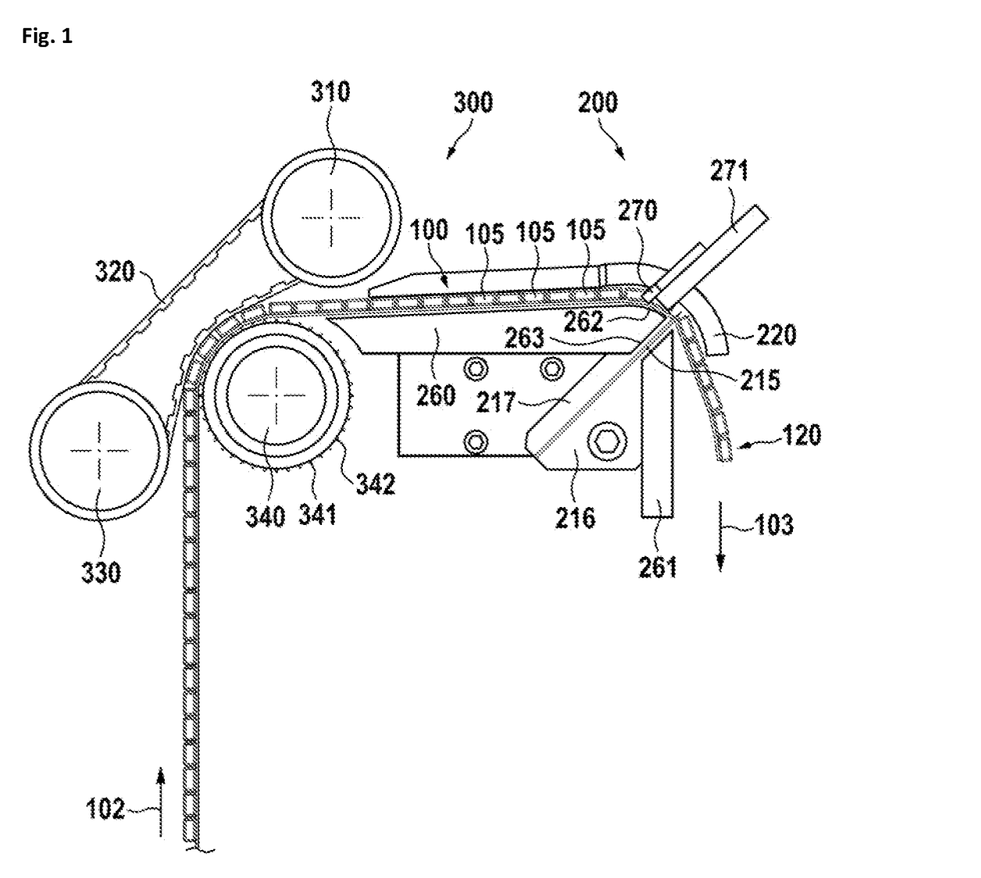
FIG. 1 shows a first embodiment.

In FIG. 1, a first embodiment is shown in a side view. The dispenser includes a transport section 300 and a cutting section 200. A belt of balancing weights 100 is fed by a drive mechanism to a cutter, where desired portions of mass material are cut from the belt. In this embodiment, a belt of balancing weights 100 comprising of a plurality of individual balancing weight segments 105, is fed at the left side in feeding direction 102 into the transport section of the dispenser. There may be a coil (not shown) for supplying the balancing weights. A transport roller 340 may be configured to transport the belt having balancing weight segments, which may be coming from an approximately vertical direction into an approximately horizontal direction, for easier cutting. A counter belt 320, which may be suspended between a first pulley 310 and a second pulley 330, which may press the belt of balancing weights 100 against the transport roller 340, and therefore generates friction to the belt of balancing weights. Friction is increased by teeth 341, 342 at the transport roller. At least the transport roller 340 may be driven by a motor (not shown). To determine the precise amount of balancing weight mass material, which has been transported, an angle encoder or counter may be provided.

After passing the transport roller, the balancing weights are pushed in an approximately horizontal direction, and are guided by a slideway 260. The slideway 260 has an end section 263 and may have a curved section 262 close before the end section 263. Cutting may be done by a knife 215, which passes close to the end section 263. The knife may be held by a knife holder 216 and may be locked to the knife holder by a counter holder 217.

Before cutting, the belt section of balancing weights 120 to be cut off of the belt is bent to an angle of 90° or less by pushing the belt against a curved belt guide 220. Bending may further be supported by the curved section 262 of the slideway 260.

The balancing weights of the curved belt form a gap between adjacent balancing weights which allows the knife 215 to slide between two adjacent balancing weights. After forming the angle, the cutter comprising a knife 215 is moved from one side to the other side through the belt of balancing weights, cutting the adhesive tape between two balancing weight segments, without cutting the balancing weight segments themselves, and therefore separating a section of cut balancing weights 120 from the belt of balancing weights 100.

To transport and/or position the belt, such that the knife exactly passes through a gap between adjacent balancing weights, a position sensor 270 may be provided which may be held by a sensor holder 271. The sensor may be arranged such, that it detects the gap to be used by the knife or a neighbored gap. The sensor may be an optical sensor or a magnetic sensor.

After cutting, a section of cut balancing weights 120 slides or falls down along sidewall 261 in a direction as indicated by arrow 103, and may be delivered to a tray from which either a robot or a person may take out the balancing weight for applying it to a wheel.

Figure 2:
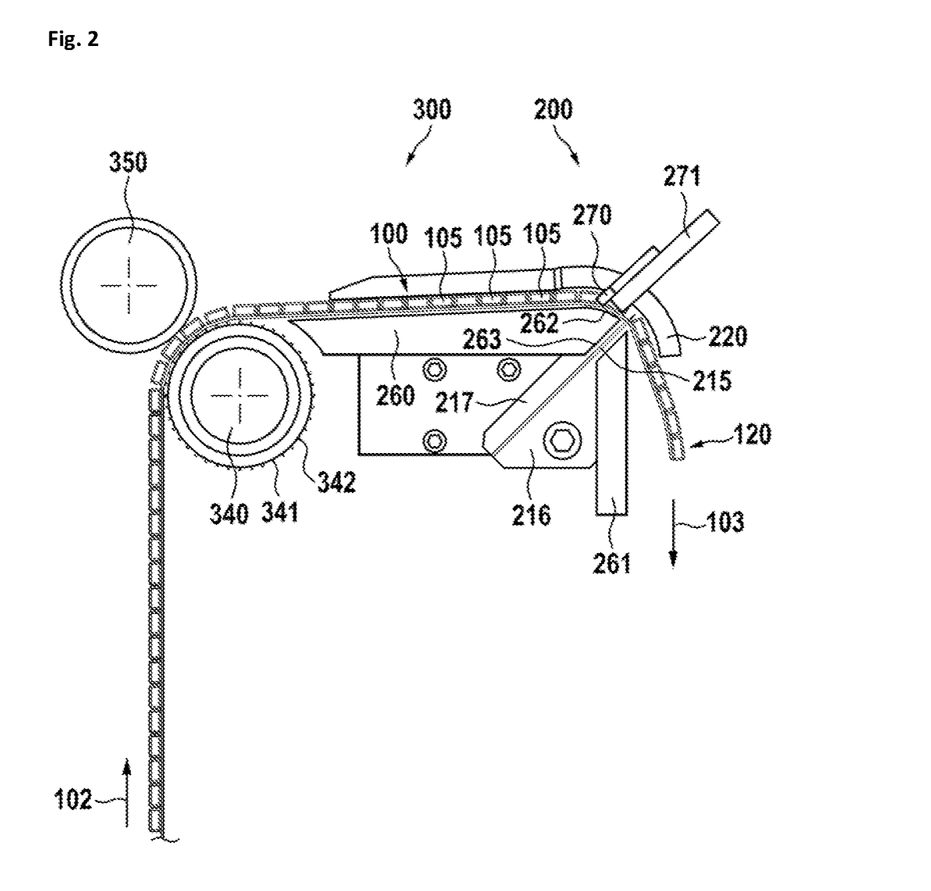
FIG. 2 presents an alternative embodiment.

FIG. 2 shows an alternate embodiment, similar to the embodiment above. Here, instead of the counter belt a counter roller 350 is provided.

Figure 3:
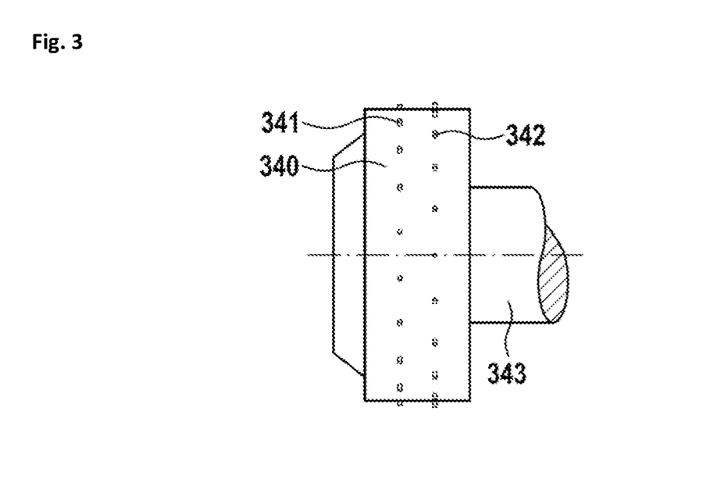
FIG. 3 shows a transport roller in detail.

FIG. 3 shows a transport roller in detail. The transport roller 340 may be driven via a driveshaft 343 by a motor (not shown) and via an optional gearbox (not shown). The transport roller may be cylindrically shaped. It may have a plurality of teeth 341, 342 or spikes at its outer circumference. These teeth penetrate into the adhesive tape of the belt of balancing weights and improve friction for precise transport of the belt. There may be multiple rows of teeth which may be displaced against each other.

Figure 4:
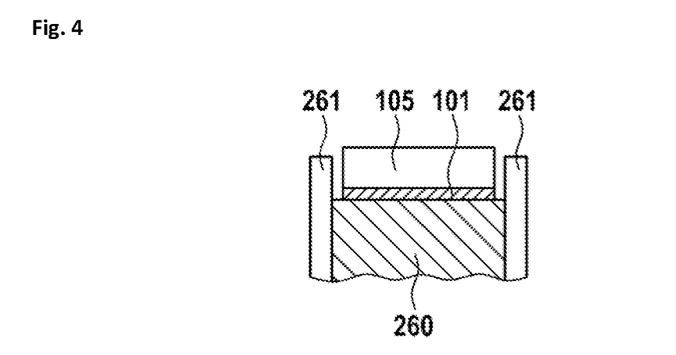
FIG. 4 is a sectional view of the slideway.

FIG. 4 is a sectional view of the slideway. The slideway 260 may have at least one sidewall 261 to prevent the belt from sliding of the slideway. At the top of the slideway a belt of balancing weights comprising multiple balancing weight segments 105 on an adhesive tape 101 may be pushed forward by the transport roller 340.

Figure 5:
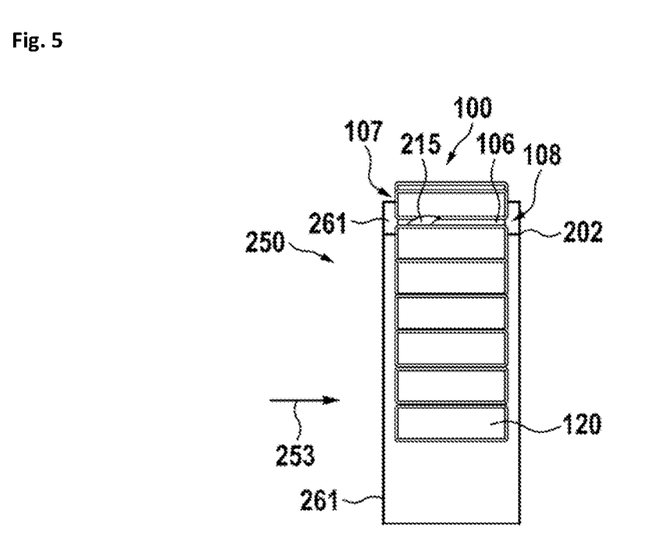
FIG. 5 shows the operation of the cutter.

In FIG. 5, the operation of the cutter 250, which includes a knife holder 216 with attached knife 215, is shown. This image is a sectional view from right side of FIG. 1 to the cutter, where the counter holder has been omitted. Due to bending the belt of balancing weights, a gap 106 forms at the cutter edge 202, through which a knife 215 (attached to a knife holder 216) is moved in a direction 253 from a first side 107 of the belt of balancing weights to the second side 108 to separate the section of cut balancing weights 120 from the belt of balancing weights 100.

Figure 6:
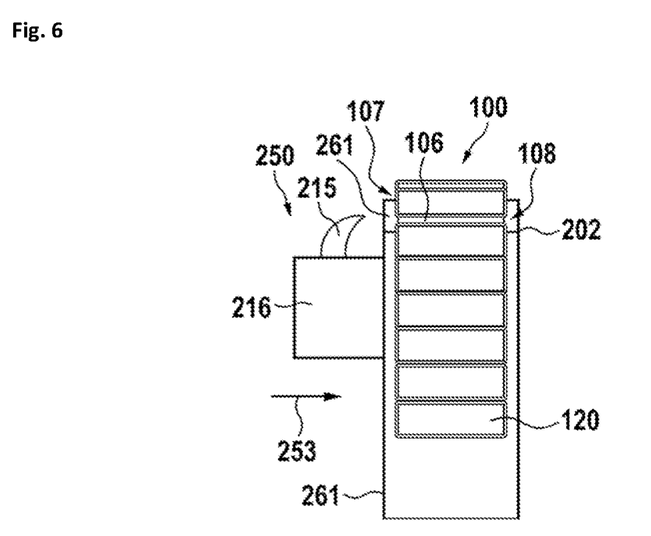
FIG. 6 shows the cutter in an idle state.

In FIG. 6, the cutter 250 is shown in an idle state, where the knife 215 is outside of the belt of balancing weights.

It will be appreciated to those skilled in the art having the benefit of this disclosure that this invention is believed to provide a dispenser for balancing weights. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 belt of balancing weights
101 adhesive tape
102 balancing weight feeding direction
103 balancing weight delivery direction
105 balancing weight segment
106 gap between balancing weight segments
107 first side
108 second side
120 cut balancing weights
200 cutting section
215 knife
216 knife holder
217 knife counter holder
220 belt guide
250 cutter
253 cutter movement
260 slideway
261 sidewall
262 curved section
263 end section
270 position sensor
271 sensor holder
300 transport section
310 first pulley
320 counter belt
330 second pulley
340 transport roller
350 counter roller
341 first teeth
342 second teeth

The invention claimed is:

1. An automatic dispenser configured to separate balancing weight segments contained in a belt of balancing weights, the dispenser comprising:
a transport section and a cutting section, wherein
the transport section is configured to transport the belt of balancing weights towards the cutting section and includes a transport roller with a circumferential outer surface, wherein the circumferential outer surface has a plurality of teeth dimensioned to generate friction with the belt of balancing weights;

the cutting section has an arc shaped belt guide configured to conform the belt of balancing weights to a curve to open at least one gap between neighboring balancing weight segments, the cutting section further having a knife configured to move along a cutting path from a first side of the belt of balancing weights to a second side of said belt to cut the belt of balancing weights between two individual balancing weight segments at the at least one gap.

2. The automatic dispenser according to claim 1, further comprising at least one of a counter roller and a counter belt to press the belt of balancing weights against the transport roller to increase said friction.

3. The automatic dispenser according to claim 2, comprising a sensor configured to detect gaps between individual balancing weights of the belt of balancing weights and produce an output signal representing said gaps.

4. The automatic dispenser according to claim 3, wherein the sensor is mounted at a location near the cutting path, and further configured to count a number of balancing weights based on the output signal from the sensor.

5. The automatic dispenser according to claim 1, comprising a sensor configured to detect gaps between individual balancing weights of the belt of balancing weights and produce an output signal representing said gaps.

6. The automatic dispenser according to claim 5, wherein the sensor is mounted at a location near the cutting path.

7. The automatic dispenser according to claim 5, configured to count a number of balancing weights based on the output signal from the sensor.

8. The automatic dispenser according to claim 1, wherein chosen individual balancing weight segments comprise a metal.

9. The automatic dispenser according to claim 8, wherein the metal includes zinc or steel.

* * * * *